INVENTORS
AKIRA WATANABE &
RYOTA MIYOSHI
BY
J. E. Armstrong
their Attorney

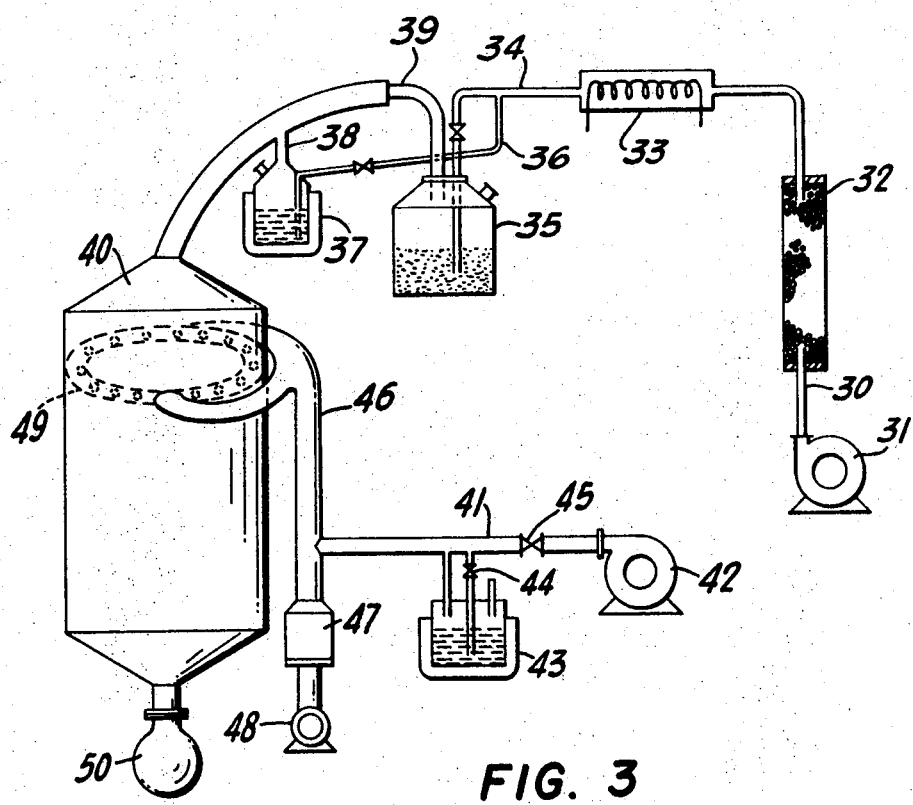
FIG. 3
FIG. 2
SECTION L-L'
INVENTORS
AKIRA WATANABE &
RYOTA MIYOSHI
BY 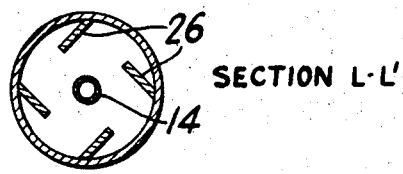
their Attorney

United States Patent Office 3,582,382
Patented June 1, 1971

3,582,382
METHOD OF PRODUCING NACREOUS PIGMENT
Akira Watanabe and Ryota Miyoshi, Tokyo, Japan, assignors to Nihon Koken Kogyo Company, Ltd., Tokyo, Japan
Filed July 15, 1968, Ser. No. 744,835
Claims priority, application Japan, July 20, 1967, 42/46,328; Aug. 15, 1967, 42/52,009
Int. Cl. C09c 1/28
U.S. Cl. 106—291
7 Claims

ABSTRACT OF THE DISCLOSURE

A nacreous pigment comprising a translucent layer of titanium dioxide deposited on a translucent flake substrate, such as mica, is made by continuously contacting the substrate particles with titanium tetrachloride vapor at atmospheric pressure, followed by continuously hydrolyzing the deposited titanium tetrachloride to form titanium dioxide.

BACKGROUND OF THE INVENTION

For many years titanium dioxide has been considered to be an excellent substance from which to make nacreous pigments of superior characteristics. Many attempts have been made to provide an economical process for the production of such pigments by preparing the titanium dioxide in the form of thin, lustrous flakes or platelets. The essential difficulty involved in devising such a process is that titanium dioxide does not crystalize as platelets or flakes. It has, therefore, been necessary to devise special methods to produce thin platelets of titanium dioxide from titanium salts, such as titanium tetrachloride and lower alkyl titanium esters.

Because of the difficulty in preparing platelets or flakes of titanium dioxide, it has been proposed to produce a titanium dioxide film on a flake substrate. One method of accomplishing this is described in Japanese patent Showa 39/28,885, published Dec. 12, 1964. This method consists of providing a solvent solution of titanium tetrachloride or a titanium ester in a solvent, such as butanol, solvent naphtha, amyl acetate, chloroform, carbon tetrachloride, or chlorobenzene. A flake substrate, such as mica, is suspended in the solution and the titanium dioxide layer is produced on the substrate by forming a finely divided mist of the suspension and subjecting the mist to hydrolysis. Unfortunately, several difficulties are encountered in this method. The film of titanium dioxide deposited on the substrate is often not even or uniform. Frequently, the individual particles of flake substrate tend to coagulate and, after drying, many flake particles remain together in clusters, which reduced the luster of the resulting pigment. Also, using this method it has been very difficult to produce the titanium dioxide-coated substrate on a large scale, because of problems encountered in controlling the speed at which the suspension of solution and flake is converted into a mist, the rate of hydrolysis, and the separation of flake particles during and after drying.

Another method of producing a nacreous pigment comprising a flake substrate coated with titanium dioxide is described by Howard R. Linton in U.S. Pat. 3,087,828. According to Linton, a translucent layer of titanium dioxide is deposited on a mica substrate by suspending the mica in a dilute, strongly acidic solution of titanyl sulfate at ambient temperatures and then hydrolyzing the titanium sulfate by rapidly heating to about 90–100° C. for a period of 2–3 hours. An alternative method proposed by Linton involves the exposure of hot flakes of mica to a vapor of organic titanate ester in the absence of air or water vapor and preferably in a vacuum. The vacuum process of Linton is carried out at about 600° C., and understandably, is not readily adaptable to large-scale production, because of the equipment required to carry out the reaction under such drastic conditions.

SUMMARY OF THE INVENTION

We have found that we are able to provide lustrous nacreous pigment comprising a translucent layer of titanium dioxide deposited on a translucent flake substrate by a vapor phase process at atmospheric pressure. According to the invention, an agitated mass of finely divided particles of the substrate is moved through a reaction zone maintained at a temperature of 150–400° C. Titanium tetrachloride is continuously deposited on the particles by contacting them with titanium tetrachloride vapor at atmospheric pressure. In the terminal portion of the reaction zone the deposited titanium tetrachloride is hydrolyzed by contacting it with moist air, and a nacreous pigment of excellent pearly luster is recovered from the reaction zone.

BRIEF DESCRIPTION OF THE DRAWINGS

Various types of apparatus can be used for the process of the invention, such as those illustrated in FIGS. 1 and 3.

FIG. 2 shows a cross-section of the rotary kiln taken at line LL' of FIG. 1.

FIG. 3 shows an alternate embodiment using a tower reactor.

Referring to FIG. 1, rotary kiln 13, having a length to diameter ratio of about 5–20:1, is heated externally by burners 16 with gas supplied from line 18. The kiln 13 is functionally divided into a feed section A, a contacting section B, and a hydrolysis section C. By regulating the amount of heat applied from burners 16, the temperature in the various sections can be controlled as desired. The flake substrate, such as mica, is charged continuously into kiln 13 by means of vibratory feeder 11. At the same time, a gas mixture containing titanium tetrachloride is introduced through spout pipe 14, which is positioned by means of support 25. The gas mixture is obtained by blowing hot inert gas, such as air, from reservoir 2 by means of compressor 1 through flowmeter 3 and dryer 4. In chamber 5 the moisture content of the gas is determined by highly sensitive hygrometer 6. The gas then flows through electric heater 8 into a reservoir of titanium tetrachloride in container 9. The temperature of the gas in heater 8 is controlled by sliding resistance equipment 7 and the temperature of the mixed gas entering pipe 14 is measured by thermometer 10. Spout pipe 14 has a plurality of holes (not shown) which serve to uniformly distribute the mixed gas in section B of kiln 13. The rotary kiln 13 is supported by wheel supports 19 and is driven slowly by means of motor and downgear 17 through driving chain 20. The A section of the kiln is positioned slightly higher than the terminal or hydrolysis section C. Inside the kiln there are fixed baffle plates 26 which serve to facilitate the movement of the flake particles from section A toward section C as kiln 13 is being rotated. The arrangement of the baffle plates is shown more clearly in FIG. 2, which is a cross-section taken at line LL' of FIG. 1.

Figure 1:
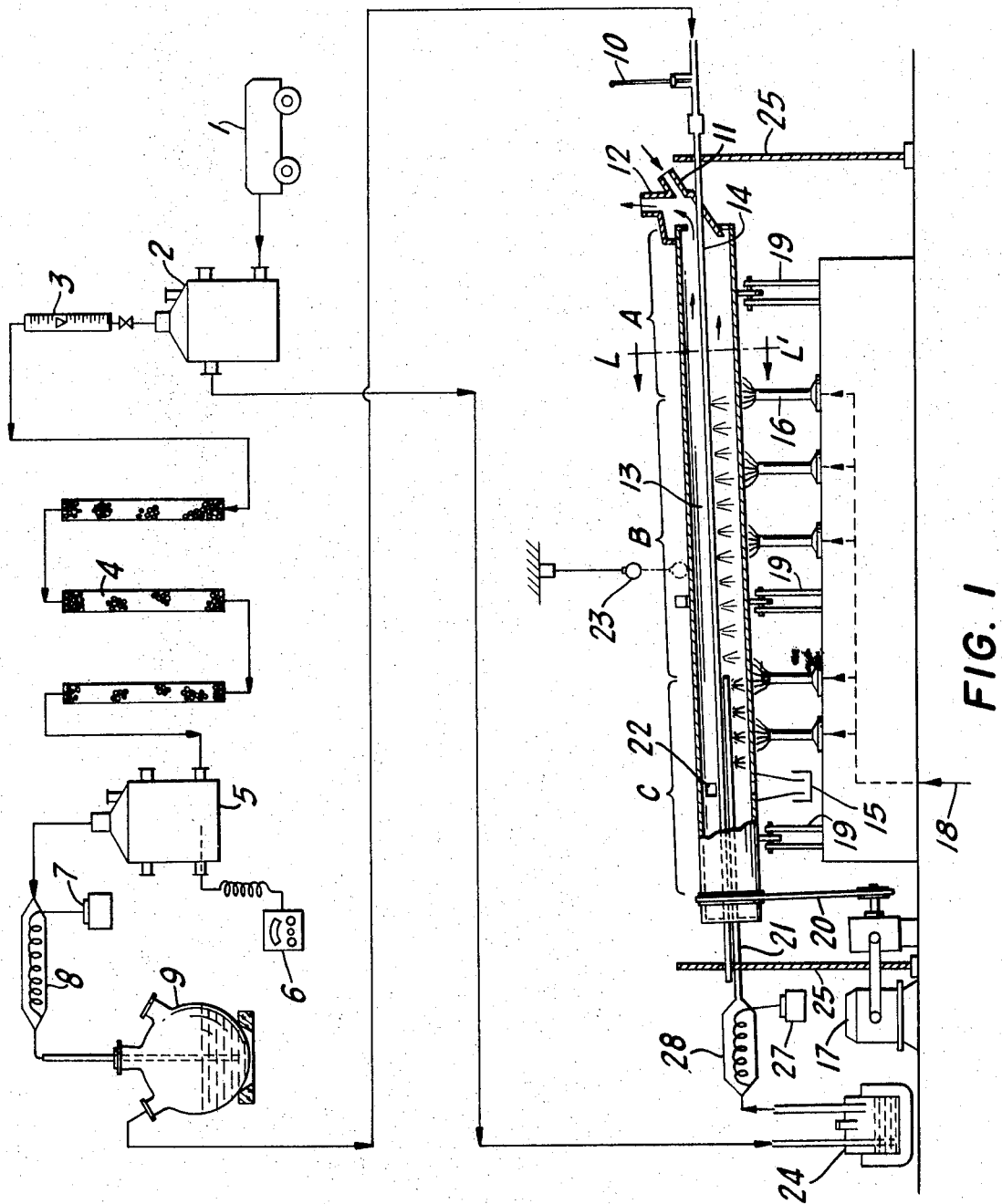
FIG. 1 shows a preferred apparatus in which the reaction zone is a rotary kiln.

The B section of rotary kiln 13 is the contacting section in which the mixed gas containing titanium tetrachloride is contacted with the translucent flake substrate. Section A, the feed section, can be used as a preheater section in which the flake substrate can be brought to the desired temperature prior to contacting it with the titanium tetrachloride. In Section C, hydrolysis of the titanium tetrachloride occurs as a result of contacting the coated substrate particles with heated moist air introduced through pipe 21. The heated moist air is provided by air flowing from reservoir 2 through heated water tank 24 and electric heater 28, which is regulated by resistance equipment 27. Hydrogen chloride formed during hydrolysis is removed through vent 12. A hammer 23, positioned above the center part of kiln 13, is used periodically to vibrate the kiln walls to prevent adherence of the flake substrate thereto. The nacreous pigment product is discharged through port 22 into collector 15.

FIG. 3 shows an alternative apparatus used for the process of the invention. Referring to FIG. 3, air is introduced through line 30 by means of blower 31. The air is first dried by passing it through dryer 32 and subsequently heated in heater 33. From heater 33 the air is passed through conduit 34 into flake feeder tank 35 and through conduit 36 into titanium tetrachloride reservoir 37. Mixed gas containing vaporized titanium tetrachloride is introduced through pipe 38 into reactor 40 in which the gas is contacted with a stream of hot air containing flake substrate introduced into reactor 40 through pipe 39. At the same time, air in pipe 41 is introduced by blower 42 through water tank 43. The air supply to tank 43 is regulated by cocks 44 and 45. The moist air traveling from water tank 43 is mixed in line 46 with hot air delivered from heating furnace 47 by blower 48. The moist, hot air is introduced to reactor 40 through ring pipe 49 into the upper portion of reactor 40 and hydrolyzed flakes consisting of a film of titanium dioxide deposited on the translucent flake substrate are gathered in collector 50.

DETAILED DESCRIPTION

The nacreous pigments of the invention comprise a thin, uniform, translucent layer of titanium dioxide deposited on a translucent flake substrate. The useful substrates are naturally occurring or synthetic materials having the properties of heat resistance, acid resistance, and solvent resistance. Preferred materials include natural or synthetic mica flakes, glass flakes, and barium sulfate. Also useful are stannous oxalate, zinc hydroxide, magnesium oxalate, magnesium sulfate, cadmium oxalate, and barium oxalate. The individual particles of the translucent flake substrate must have a smooth surface and must be relatively uniform. The substrate particles range in diameter from 5–50 microns and have a thickness range of 0.1–1 micron. Preferred ranges are 20–30 microns in diameter and 0.2–0.5 micron in thickness.

The appearance of the nacreous pigment product is determined by controlling the thickness of the translucent lamellae of titanium dioxide. If the optical thickness $N^d$ (the multiplication product of the actual thickness $d$ times the index of refraction N) ranges between 1000 and 1800 A., the product appears to be silver-white. If the optical thickness is increased to 2000 A., the product is gold in appearance. At 2200 A., the product is pink; at 2400 A., purple; at 3000 A., blue; and at 4000 A., green. Successive interference colors of second order begin with gold at about 4400 A. The interference colors are repeated in succession up to a thickness of about 20,000 A. An accurate method of measuring the thickness of the product using a standard interference microscope modified by a split-image analyzer has been devised by Dr. Bernard Wunderlich. The basis of the method is described in Dr. Wunderlich's article on interference microscopy appearing in the Journal of Polymer Science, vol. 56, pp. 19–25 (1962).

We have found experimentally that, using a standard refined mica having a particle size of 20–30 microns in diameter and 0.2 micron in thickness, a final nacreous pigment product containing 19 percent by weight titanium dioxide reflects a brilliant silver-white color. Pigment containing 25 percent by weight titanium dioxide reflects gold; 28 percent by weight, pink; 33 percent by weight, purple; and 37 percent by weight, blue.

The thickness of the titanium dioxide layer and the intensity of pearly luster in the resulting product are controlled by the reaction temperature, the flow rate and temperature of the heated air used to dilute the titanium tetrachloride vapor, the degree of dilution of the titanium tetrachloride vapor, the amount of moisture contained in the air used for hydrolysis, and the contact time both for deposition of the titanium tetrachloride upon the translucent flake substrate and for the hydrolysis step.

Since the deposition of the titanium tetrachloride on the translucent flake substrate and subsequent hydrolysis occur in a continuous reaction zone, the temperature of the zone is more or less governed by the conditions required for the hydrolysis step. If the hydrolysis reaction occurs at a temperature below 150° C., the final product becomes yellowish in appearance and there is extensive coagulation of the flake particles. Coagulation also occurs if the temperature of hydroysis is about 400° C. At the preferred temperatures, which are between 150 and 300° C., the hydrolysis reaction is facilitated by the ease of removal of the hydrogen chloride formed during the reaction.

In order to obtain a smooth, even deposition of titanium compound on the surface of the substrate, it is necessary to dilute the titanium tetrachloride vapor with an inert gas, preferably dry air. Other dry, inert gases, such as nitrogen and carbon dioxide, can be used in lieu of the air. If the titanium tetrachloride vapor is not diluted, the result is a deposition of white powder-like titanium dioxide on the surface of the substrate. If this occurs, the luster of the resulting product is drastically diminished. It is convenient to continuously dilute the titanium tetrachloride vapor by adding 2 g. of titanium tetrachloride to 10 liters of air per minute, thus providing a mixed gas containing 2.4 percent by volume titanium tetrachloride. If the concentration of titanium tetrachloride in the mixed gas is greater than 5 percent at the same flow rate, it is difficult to obtain a smooth deposition of titanium tetrachloride on the surface of the product. If the flow rate of the mixed vapor is reduced, the titanium tetrachloride concentration must be correspondingly increased. At any practical flow rate the titanium tetrachloride concentration should be less than 10 percent by volume, preferably between 1–3 percent by volume. A practical flow rate for the mixed gas depends, of course, upon the size and configuration of the reactor and the feed rate of the substrate particles.

The temperature of the heated dry air for providing the mixed gas containing the titanium tetrachloride vapor is between 70 and 130° C. Temperatures above 130° C. are not suitable, because of the boiling point of the titanium tetrachloride. Temperatures of 70–100° C. are preferred.

The theoretical amount of water required for hydrolysis is two moles of water for each mole of titanium tetrachloride deposited on the surface of the substrate. Thus, the moist air used during the hydrolysis step must provide water at least in this amount and, preferably, from 5–15 times the required amount of water. If insufficient water is present during the hydrolysis step, the resulting product has a somewhat yellowish luster.

The reaction zone, which can be conveniently a rotary kiln or a tower reactor, should have an overall length approximately 5–20 times its width in order to provide sufficient contact time for both deposition of the titanium tetrachloride and subsequent hydrolysis in order to obtain the desired thickness of the translucent titanium dioxide layer. If the thickness of the titanium dioxide layer deposited on the substrate is insufficient, the product may be recycled as many times as may be required until the desired thickness is obtained. The most lustrous product is obtained if the reaction is carried out in one operation without the need of recycle.

The nacreous pigment obtained according to the invention is non-toxic and, in addition, has excellent heat resistance, weather resistance, and resistance against sulfur stain. The product can be used in cosmetics, toys, tablewares, coating of china, and other fields where conventional toxic pearl pigments cannot be applied.

Our invention is further illustrated by the following examples:

EXAMPLE I

A rotary kiln, 85 mm. in diameter and 2000 mm. in length and arranged as shown in FIG. 1 of the drawings, was used for the continuous production of nacreous pigment according to the method of the invention. The feed section and hydrolysis section were maintained at a temperature of 400° C. and the center section wherein the deposition of the titanium tetrachloride vapor occurs was maintained at 300° C. The rotary kiln was driven at a rotation speed of 5½ r.p.m. Air from the dryer (moisture content below 3 percent) at a controlled flow rate was heated to 80° C. in the electric heater and introduced into the reservoir for the titanium tetrachloride. The vapor mixture thus produced was sprayed through the small holes of the pipe located within the rotary kiln at a rate of 2.1 g. titanium tetrachloride (diluted with 10 liters of hot air) per minute.

At the same time, flakes of natural mica having a particle size of about 15 microns in diameter and 0.2 micron in thickness were continuously charged at the rate of 1.5 g. per minute. The mica flakes were spread inside the kiln by the action of the baffle plates as the kiln was being rotated. The feed section of the kiln was positioned 50 mm. higher than the hydrolysis section to provide for gravity flow. Excess gas mixture and hydrogen chloride formed during hydrolysis was continuously removed from a vent located in the A section. As the mica flakes traveled the length of the kiln, which required about 40–50 minutes, they first had uniformly deposited thereon a layer of titanium tetrachloride which was then, because of the continuous nature of the reactor, almost instantly hydrolyzed by moisture and heat to titanium dioxide. Hydrolysis was accelerated by the use of heated steam supplied from a water reservoir. The reactor was tapped periodically with a hammer to prevent the flakes from adhering to the walls.

The resulting product was a silver-white nacreous pigment of good luster. In order to provide a more lustrous product, the pigment thus obtained was calcined at 800° C. in an electric furnace. Calcination temperatures of up to 1100° C. can be conveniently used.

EXAMPLE II

A portion of the product obtained according to Example I was recycled until the pigment contained 25 percent by weight titanium dioxide. The resulting pigment had a golden iridescent luster. At 28 percent by weight titanium dioxide, the resulting pigment is pink; at 33 percent, purple; and at 37 percent, blue. As mentioned above, nitrogen or other inert gases can be used in lieu of air to form the gas mixture containing the titanium tetrachloride. The use of nitrogen has the advantage of providing a moisture-free gas mixture, which eliminates the formation of colloidal particles during the reaction.

EXAMPLE III

If barium sulfate is substituted for the mica used in Example I, a nacreous pigment having an excellent pearly luster is obtained.

EXAMPLE IV

A tower reactor such as that shown in FIG. 3 was used to produce nacreous pigment according to the invention. A 300 g. quantity of natural mica having a particle size of through 250 mesh (U.S. Sieves) was charged into the flake feeder tank. Hot air was introduced at a controlled rate and the dried mica whirled through a pipe into the reactor. Simultaneously into a solution of titanium tetrachloride dry hot air was introduced which carried the titanium tetrachloride vapor into the reactor at a rate comparable to that of Example I. Titanium tetrachloride was deposited on the surface of the mica at the top of the reactor. Simultaneously moistened air, which had been previously passed through a water bath, was heated to 200° C. and blown through the small holes of a ring-shaped pipe located at the upper part of the reaction tower adjacent the area in which the mica flakes were coated with titanium tetrachloride. The titanium tetrachloride was immediately hydrolyzed and the mica flakes traveled down the tower and were collected in a collector sack. A 340 g. quantity of lustrous silver-white pigment was obtained. The resulting pigment was calcined at a temperature of 850° C. to obtain a more intense luster.

We claim:
1. A method of producing a nacreous pigment comprising a translucent layer of titanium dioxide deposited on a translucent flake substrate comprising:
   (a) moving an agitated mass of finely divided particles of said substrate through a reaction zone maintained at a temperature of 150–400° C. and at atmospheric pressure;
   (b) continuously depositing titanium tetrachloride on said particles by contacting said particles with a dry gaseous mixture of titanium tetrachloride and an inert gas;
   (c) hydrolyzing the titanium tetrachloride deposited on said particles in the terminal portion of said zone by contacting the titanium tetrachloride-coated particles with moist air containing sufficient water to effect hydrolysis; and
   (d) recovering the resulting nacreous pigment from said zone.
2. Method according to claim 1 wherein the reaction zone is maintained at a temperature of 150–300° C.
3. Method according to claim 1 wherein the dry gaseous mixture is air containing from 1 to 3 percent by volume of titanium tetrachloride.
4. Method according to claim 3 wherein the air is preheated to a temperature of 70–130° C.
5. Method according to claim 1 wherein the flaky substrate is mica.
6. Method according to claim 1 wherein the moist air contains from 5–15 times the theoretical amount of water required for hydrolysis.
7. Method according to claim 1 wherein the product is recycled to increase the thickness of the translucent layer of titanium dioxide.

References Cited

UNITED STATES PATENTS 3,378,386   4/1968   Leddy _____ 106—308I

FOREIGN PATENTS 28,885   12/1964   Japan _____ 106—291

JAMES E. POER, Primary Examiner

U.S. Cl. X.R.

106—308B